US011679839B2

(12) United States Patent
Shimizu

(10) Patent No.: US 11,679,839 B2
(45) Date of Patent: Jun. 20, 2023

(54) MOTORCYCLE

(71) Applicant: HONDA MOTOR CO., LTD., Tokyo (JP)

(72) Inventor: Kenzo Shimizu, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 210 days.

(21) Appl. No.: 17/341,443

(22) Filed: Jun. 8, 2021

(65) Prior Publication Data
US 2021/0387697 A1    Dec. 16, 2021

(30) Foreign Application Priority Data
Jun. 10, 2020  (JP) .............................. JP2020-100809

(51) Int. Cl.
| B62M 23/00 | (2006.01) |
| H02K 49/10 | (2006.01) |
| B62M 11/04 | (2006.01) |
| B62K 11/00 | (2006.01) |

(52) U.S. Cl.
CPC ............ *B62M 23/00* (2013.01); *B62M 11/04* (2013.01); *H02K 49/102* (2013.01); *B62K 11/00* (2013.01)

(58) Field of Classification Search
CPC ....... H02K 49/00; H02K 49/10; H02K 49/102; B62M 11/00; B62M 11/04; B62M 23/00; B62M 7/00; B62M 7/04; B62M 17/00; B62M 19/00
See application file for complete search history.

(56) References Cited

U.S. PATENT DOCUMENTS

2006/0091748 A1 * 5/2006 Yoda .................... H02K 49/102
                                                              310/83
2008/0234055 A1   9/2008 Nimura et al.

FOREIGN PATENT DOCUMENTS

| EP | 1906054 | 4/2008 |
| JP | 08336274 A * | 12/1996 |
| JP | 4072186 | 4/2008 |
| JP | 2008-230382 | 10/2008 |
| WO | WO2007010780 A1 * | 1/2007 |

* cited by examiner

Primary Examiner — Tran N Nguyen
(74) Attorney, Agent, or Firm — Amin, Turocy & Watson, LLP

(57) ABSTRACT

The power transmission mechanism includes a non-contact power transmission mechanism and a mechanical power transmission mechanism, both of which are provided in parallel on a power unit side or a rear wheel side. The mechanical power transmission mechanism has a crown gear and a pinion that are meshed at the time of low-speed rotation of the engine and are separated at the time of medium-high speed rotation thereof.

4 Claims, 9 Drawing Sheets

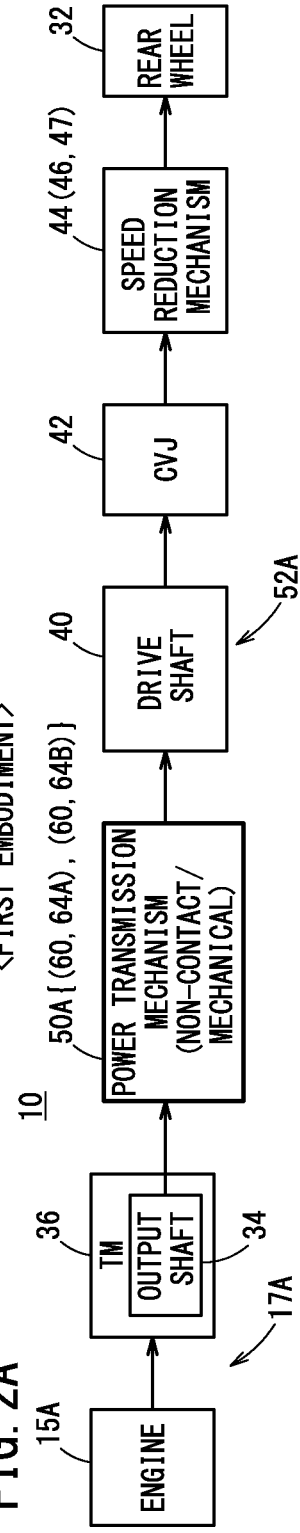
FIG. 2A <FIRST EMBODIMENT>
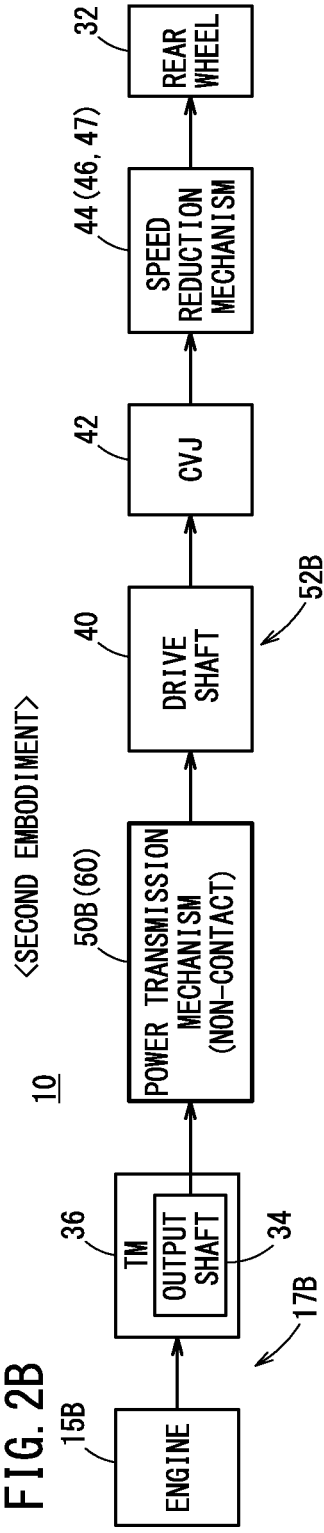
FIG. 2B <SECOND EMBODIMENT>
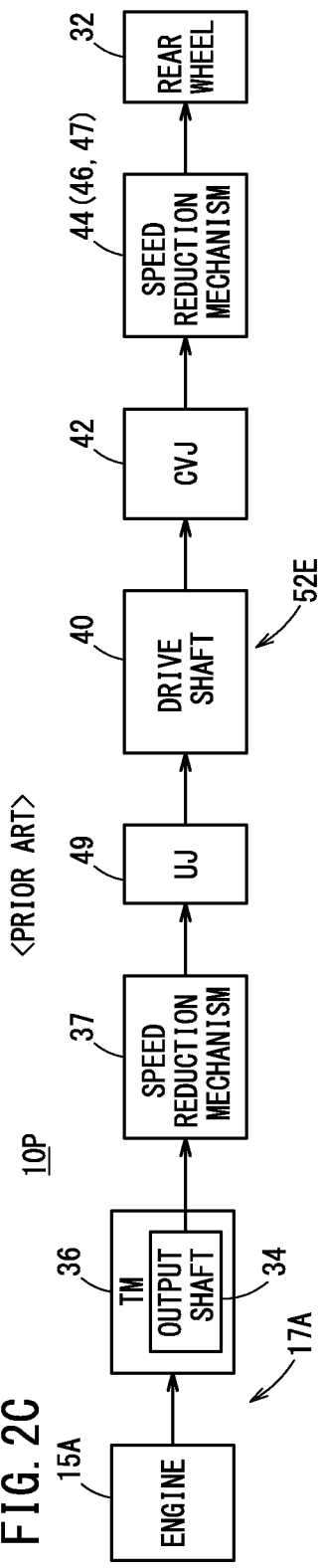
FIG. 2C <PRIOR ART>

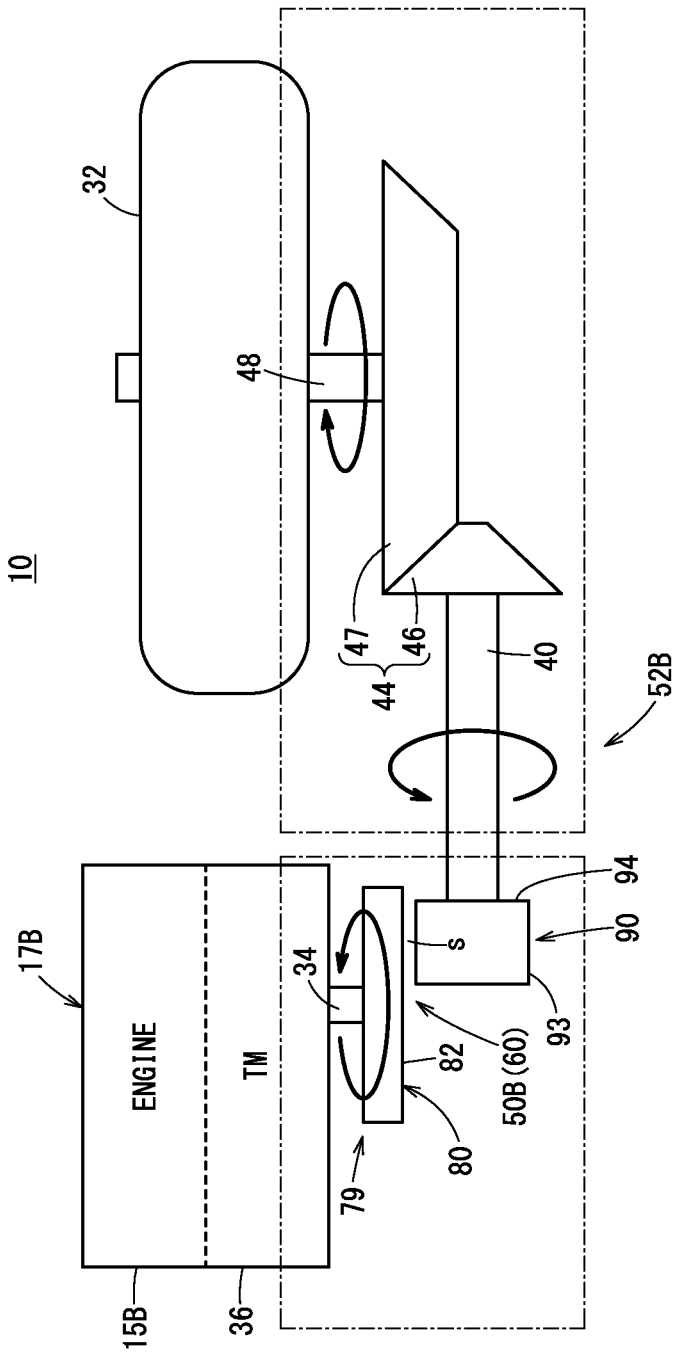

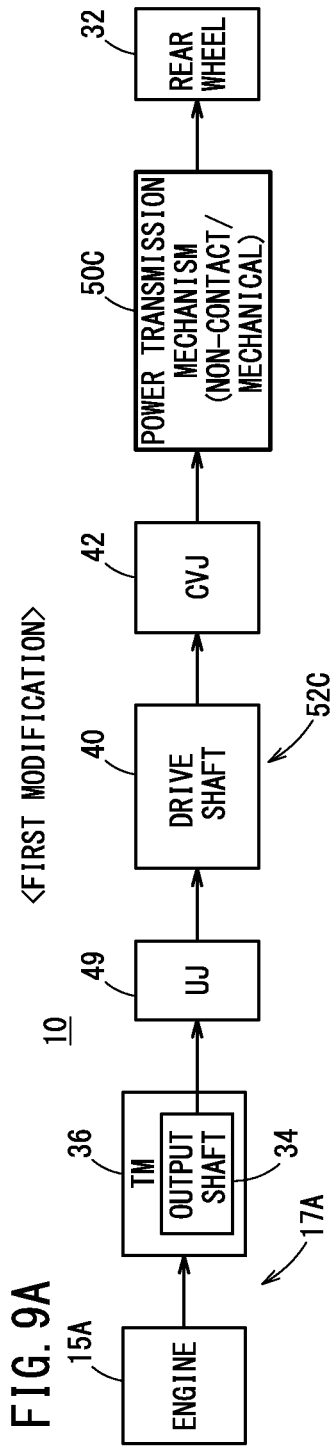
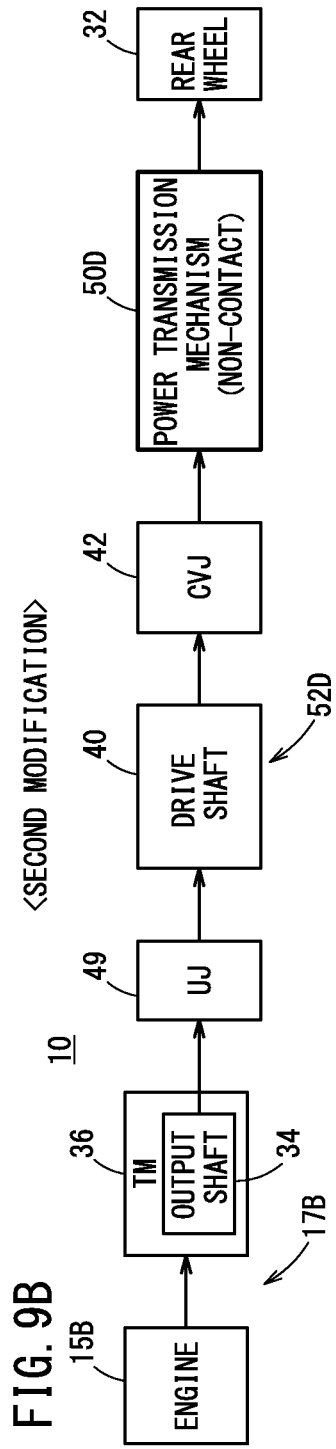

MOTORCYCLE

CROSS-REFERENCE TO RELATED APPLICATION

This application is based upon and claims the benefit of priority from Japanese Patent Application No. 2020-100809 filed on Jun. 10, 2020, the contents of which are incorporated herein by reference.

BACKGROUND OF THE INVENTION

Field of the Invention

The present invention relates to a motorcycle including a power transmission mechanism for transmitting power of a power unit to a rear wheel.

Description of the Related Art

For example, JP 2008-230382 A discloses a shaft drive type motorcycle in which power of an engine is transmitted from an output shaft of a transmission to a rear wheel via a shaft drive mechanism. The shaft drive mechanism includes a universal joint, a drive shaft, a constant velocity joint, a bevel pinion, and the like.

In a shaft drive type motorcycle, a bevel gear may be interposed between the output shaft of the transmission and the universal joint for size reduction. In this case, a damper cam may be interposed between the transmission and the bevel gear in order to protect the transmission.

Such a shaft drive type motorcycle has advantages in that power loss is small and maintenance is easy because lubrication is unnecessary, as compared with a chain-drive type motorcycle.

However, the conventional shaft drive type motorcycle has a problem in that the number of components from the engine to the rear wheel is large and the weight is large as compared with the chain-drive type motorcycle. In addition, there is a problem in that it is necessary to increase the assembly accuracy of the engagement components such as the bevel gear and the universal joint, and that it takes time to perform shim adjustment or the like.

On the other hand, there is known a non-contact power transmission mechanism that transmits rotational power from a drive shaft to a driven shaft in a non-contact manner using magnetic force of a magnet.

For example, JP 4072186 B discloses a non-contact power transmission mechanism in which a magnetic disk and a magnetic cylinder are magnetically engaged with each other in a non-contact manner. On one surface of the magnetic disk, a magnet which is magnetized so as to have radially curved magnetic bands is provided. A magnet with helically skewed magnetization is provided on the outer peripheral surface of the magnetic cylinder.

In the non-contact power transmission mechanism using the magnetic coupling, since there is no mechanical coupling between the drive shaft and the driven shaft, smooth power transmission without pulsation is possible.

SUMMARY OF THE INVENTION

If the non-contact power transmission mechanism disclosed in JP 4072186 B is applied to a motorcycle, however, there is a problem that the magnetic disk and the magnetic cylinder, which are always in a non-contact and separated state, run idle when a high torque is required at the time of starting and the like.

The present invention has been made in view of such a problem, and an object thereof is to provide a motorcycle having a non-contact power transmission mechanism that is capable of transmitting power of a power unit to a rear wheel in a non-contact manner, the motorcycle being capable of transmitting power from the power unit to the rear wheel smoothly, from starting to travelling at a medium to high speed.

(1) A motorcycle according to one aspect of the present invention includes a power transmission mechanism configured to transmit power of a power unit to a rear wheel, wherein the power transmission mechanism includes a non-contact power transmission mechanism and a mechanical power transmission mechanism which are provided on a power unit side or a rear wheel side, the non-contact power transmission mechanism includes a magnetic disk whose principal surface is magnetized and a magnetic shaft facing the principal surface of the magnetic disk, the magnetic disk configured to rotate around its axis, the mechanical power transmission mechanism includes an engagement and separation member, the engagement and separation member being engaged when the magnetic disk or the magnetic shaft is rotated at a low speed, the engagement and separation member being separated when the magnetic disk or the magnetic shaft is rotated at a medium to high speed.

(2) Further, in the motorcycle, the power transmission mechanism may be provided on the power unit side, and the power of the power unit may be transmitted to the rear wheel through the power transmission mechanism and a speed reduction mechanism.

(3) Furthermore, in the motorcycle, the engagement and separation member of the mechanical power transmission mechanism may include a first gear provided on a magnetic disk side and a second gear provided on a magnetic shaft side, and teeth of the first gear may be arranged so as to surround the magnetic disk.

(4) Still further, in the motorcycle, the first gear may be a crown gear and the second gear may be a pinion meshing with the crown gear.

(1) According to the present invention, when the non-contact power transmission mechanism is rotated at a low speed, the power of the power unit is transmitted with high torque to the rear wheel by the non-contact power transmission mechanism and the mechanical power transmission mechanism, so that the motorcycle can smoothly start and travel at a low speed. Also, when the motorcycle travels at a medium to high speed, the power of the power unit is transmitted to the rear wheel only by the non-contact power transmission mechanism, so that the vibration and noise during travelling can be reduced.

As compared with a motorcycle according to prior art in which the power of the power unit is transmitted to the rear wheel by a mechanical coupling mechanism such as a chain drive type or a shaft drive type, idling (between the magnetic disk and the magnetic shaft) is allowed for an excessive load when passing through a step or the like. Therefore, structural strength of the motorcycle including the non-contact power transmission mechanism can be easily secured.

(2) When the non-contact power transmission mechanism including the magnetic disk and the magnetic shaft is arranged on the drive side which is the power unit side, the magnetic disk can be made small and the cost increase can be suppressed, compared with an example where the magnetic disk is arranged on the driven side (rear wheel side).

Also in this case, as compared with a motorcycle according to the prior art in which the power of the power unit is transmitted to the rear wheel by a mechanical coupling mechanism of a type such as a chain drive type or a shaft drive type, idling (between the magnetic disk and the magnetic shaft) is allowed for an excessive load when passing through a step or the like. Therefore, structural strength of the motorcycle including the non-contact power transmission mechanism can be easily secured.

Further, in the power transmission mechanism of the present invention, as compared with a mechanical coupling mechanism of a shaft drive type, man-hours for precise shim adjustment and the like of the bevel gear or universal joint can be reduced. Therefore, assembly work and adjustment work are facilitated. Thus, the cost of the power transmission mechanism can be reduced.

(3) Furthermore, by arranging the first gear and the magnetic disk close to each other, the size of the power transmission mechanism can be reduced. Also, the teeth of the first gear are arranged so as to surround the magnetic disk, it is possible to prevent iron sand or the like on the ground from attaching to the magnetic disk.

(4) Still further, since the first gear is a crown gear, the second gear can be easily meshed or engaged with the first gear when the rotation speed reduces (high to low). Accordingly, it is possible to transmit the power of the power unit to the rear wheel certainly, at a low speed rotation and high torque.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2A is a schematic view illustrating a shaft drive mechanism (including a non-contact power transmission mechanism) of the motorcycle according to the first embodiment;

FIG. 2B is a schematic view illustrating a shaft drive mechanism (including a non-contact power transmission mechanism) of a motorcycle according to a second embodiment;

FIG. 2C is a schematic view illustrating a shaft drive mechanism (not including a non-contact power transmission mechanism) of a motorcycle according to prior art;

FIG. 4 is a schematic view (plan view) of the motorcycle according to the second embodiment;

FIG. 9A is a schematic view illustrating a shaft drive mechanism (including a non-contact power transmission mechanism) of a motorcycle according to a first modification; and FIG. 9B is a schematic view illustrating a shaft drive mechanism (including a non-contact power transmission mechanism) of a motorcycle according to a second modification.

DESCRIPTION OF THE PREFERRED EMBODIMENTS

Embodiments of a motorcycle according to the present invention will be described in detail below with reference to the accompanying drawings.

Embodiments

[Configuration]

Figure 1:
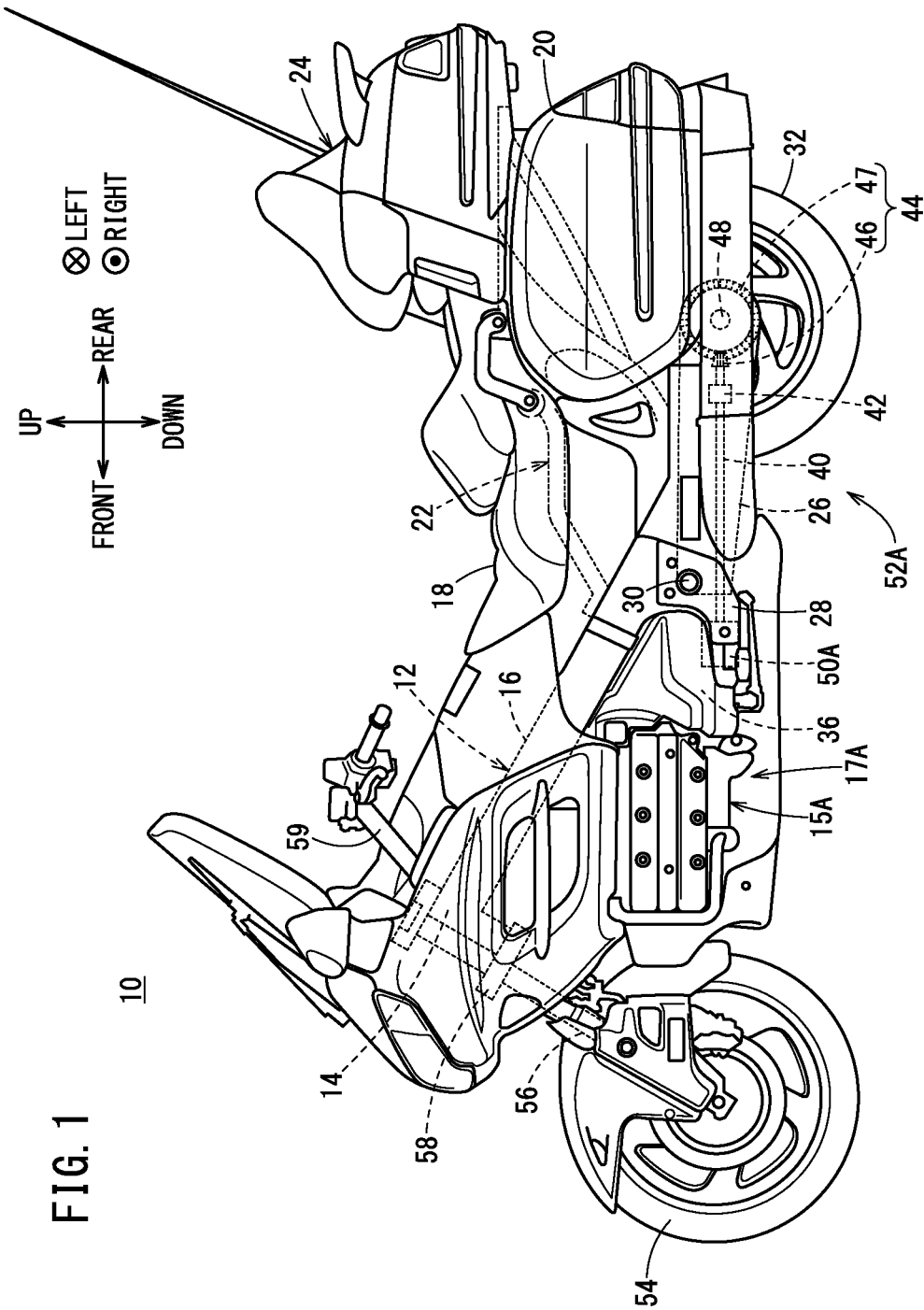
FIG. 1 is a schematic left side view of a motorcycle according to a first embodiment.

FIG. 1 is a schematic left side view of a motorcycle 10 according to a first embodiment. In the drawings, the upward, downward, left, right, frontward, and rearward directions are ones as viewed from the perspective of a vehicle occupant seated on the motorcycle 10. The motorcycle 10 is, for example, a tourer-type motorcycle including an engine 15A having a relatively large displacement (large displacement) exceeding 400 [cc].

The motorcycle 10 includes a vehicle body frame 12.

The vehicle body frame 12 includes a head pipe 14, a main frame 16 including a pair of left and right frames, and a rear frame 22. The main frame 16 extends obliquely downward and rearward from the head pipe 14 and supports the engine 15A. The engine 15A may be replaced by an electric motor. The rear frame 22 extends rearward from an upper rear end portion of the main frame 16 and supports a rear portion of the vehicle body including a battery (not shown), a seat 18, and a rear fender 20.

The rear frame 22 is provided with a rear trunk 24 at a rear portion of the seat 18.

The pair of left and right frames of the main frame 16 includes a pair of left and right pivot plates 28 provided at the rear end portion of the main frame 16 and supporting a swing arm 26.

The pivot plates 28 are provided with a pivot shaft 30 which is a bolt extending in the vehicle width direction. The swing arm 26 extends rearward from the pivot shaft 30. A cushion unit (not shown) that absorbs impact is provided between the swing arm 26 and the main frame 16. A rear wheel 32 is pivotally supported on a tip end portion of the swing arm 26.

A power unit 17A including the engine 15A and a transmission (TM) 36 is suspended by the main frame 16 and the pivot plates 28. Power from the power unit 17A is transmitted to the rear wheel 32 through a drive shaft 40 that connects the power unit 17A and the rear wheel 32. The drive shaft 40 is inserted into the swing arm 26.

FIG. 2A is a schematic view illustrating a shaft drive mechanism 52A and the like of the motorcycle 10 according to the first embodiment.

As shown in FIGS. 1 and 2A, the transmission (TM) 36, a power transmission mechanism 50A, the drive shaft 40, a constant velocity joint (CVJ) 42, and a speed reduction mechanism 44 are arranged in an inserted manner between the engine 15A and the rear wheel 32. The transmission 36 includes an output shaft (also referred to as an engine output shaft) 34. The speed reduction mechanism 44 includes a bevel pinion 46 and a bevel gear 47 that rotates integrally with a rear wheel axle 48 (rear wheel 32).

In FIG. 2A, a mechanism from the engine output shaft 34 to the speed reduction mechanism 44 is referred to as the shaft drive mechanism 52A.

In the motorcycle 10 having a relatively large displacement according to the first embodiment, the power transmission mechanism 50A is arranged on the power unit 17A side including the engine 15A and the transmission 36, which is referred to as a drive side of the drive shaft 40.

Referring back to FIG. 1, a front wheel 54 is pivotally supported by lower end portions of a pair of left and right front forks 56, and upper portions of the front forks 56 are steerably supported by the head pipe 14 at the front end of the vehicle body frame 12 via a steering stem 58. A steering handle bar 59 for front-wheel steering is attached to an upper portion of the steering stem 58.

[Power Transmission Mechanism 50A]

As described with reference to FIG. 2A, the power of the engine 15A is transmitted to the rear wheel 32 via the output shaft (engine output shaft) 34 of the transmission 36, the power transmission mechanism 50A, the drive shaft 40, the constant velocity joint 42, and the speed reduction mechanism 44.

The power transmission mechanism 50A of the motorcycle 10 according to the first embodiment includes a non-contact power transmission mechanism 60 and a mechanical power transmission mechanism 64A provided in parallel with the non-contact power transmission mechanism 60, both of which will be described in detail later.

As shown in FIG. 2B, a power transmission mechanism 50B of the motorcycle 10 according to the second embodiment includes the non-contact power transmission mechanism 60 provided on the drive side of the drive shaft 40 and does not include the mechanical power transmission mechanism 64A. That is, in the motorcycle 10 according to the second embodiment, as described later, the mechanical power transmission mechanism 64A provided in the motorcycle 10 according to the first embodiment is unnecessary.

[Configuration of Non-Contact Power Transmission Mechanism 60]

Figure 3A:
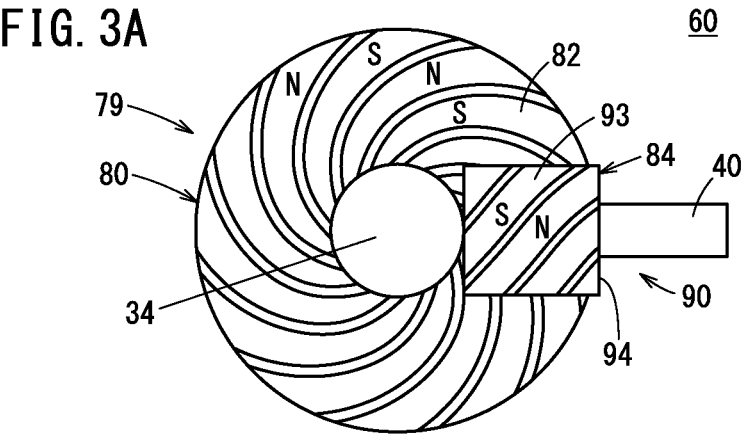
FIG. 3A is a partially-omitted front view of the non-contact power transmission mechanism.
Figure 3B:
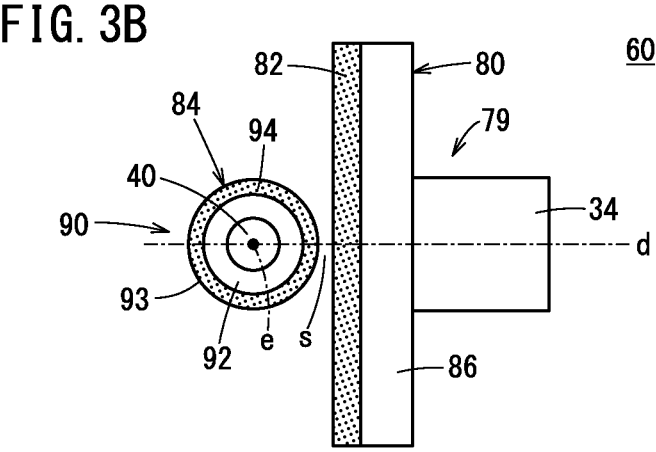
FIG. 3B is a partially-omitted right side view of the non-contact power transmission mechanism.
Figure 3C:
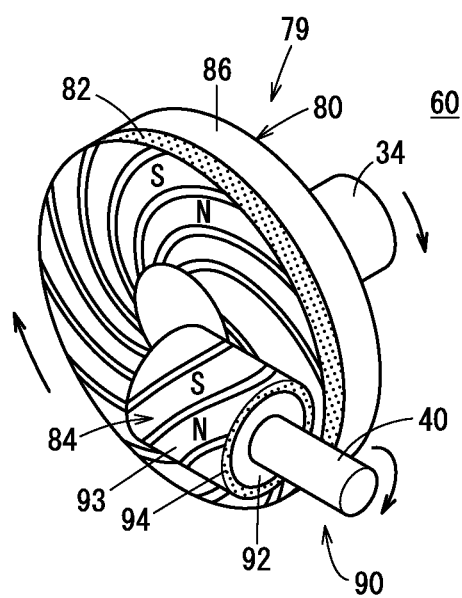
FIG. 3C is a partially-omitted perspective view of the non-contact power transmission mechanism illustrating the operation of the transmission mechanism.

FIG. 3A is the partially-omitted front view of the non-contact power transmission mechanism 60, FIG. 3B is the partially-omitted right side view of the non-contact power transmission mechanism 60, and FIG. 3C is the partially-omitted perspective view for explaining the operation of the non-contact power transmission mechanism 60. The non-contact power transmission mechanism 60 uses a known magnetic non-contact power transmission technology disclosed in JP 4072186 B or the like, and will be briefly described.

As shown in FIG. 3A to FIG. 3C, the non-contact power transmission mechanism 60 is constituted by a shaft-attached magnetic disk 79 and a magnetic shaft 90 as a shaft-attached magnetic cylinder which is disposed orthogonal to and spaced apart from the shaft-attached magnetic disk 79.

The magnetic shaft 90 is configured by a magnetic cylinder 84 and the drive shaft 40 fitted into a shaft hole of the magnetic cylinder 84.

The magnetic cylinder 84 is configured by a yoke cylinder 92 made of a magnetic material into which the drive shaft 40 is fitted, and a permanent magnet cylinder 94 fitted on the yoke cylinder 92. In other words, the magnetic cylinder 84 is configured by the permanent magnet cylinder 94 as an outer cylinder, the yoke cylinder 92 as an inner cylinder fitted into the outer cylinder, and the drive shaft 40 fitted into the shaft hole of the yoke cylinder 92, all of which are arranged concentrically.

On the other hand, the shaft-attached magnetic disk 79 is configured by a ring-shaped magnetic disk 80 and the output shaft 34 fitted into a shaft hole of the magnetic disk 80.

The magnetic disk 80 includes a ring-shaped yoke disk 86 made of a magnetic material and a ring-shaped permanent magnet disk 82 fixed to one surface of the yoke disk 86.

As shown in FIG. 3B, the permanent magnet cylinder 94 of the magnetic shaft 90 is disposed on one principal surface side of the permanent magnet disk 82 of the shaft-attached magnetic disk 79 with predetermined clearance. In this embodiment, an axis d of the shaft-attached magnetic disk 79 and an axis e of the magnetic shaft 90 intersect at one point and are perpendicular to each other.

As shown in FIGS. 3A and 3C, the axial length of the permanent magnet cylinder 94 is substantially the same as the radial length of the permanent magnet disk 82.

The principal surface of the permanent magnet disk 82 is a magnetic surface in which radially curved magnetic teeth (magnetic bands) are magnetized such that polarities S and N alternate with respect to the rotation direction.

On the other hand, the side surface of the permanent magnet cylinder 94 is a magnetized cylindrical side surface 93 in which spiral magnetic teeth (magnetic bands) are magnetized such that polarities S and N alternate with respect to the rotation direction.

[Operation of Non-Contact Power Transmission Mechanism 60]

In the non-contact power transmission mechanism 60 configured as described above, as shown in FIG. 3C, for example, when the engine output shaft 34 is rotated in the arrow direction, the rotation angle of the shaft-attached magnetic disk 79 and the rotation angle of the magnetic shaft (shaft-attached magnetic cylinder) 90 are always rotated at a constant ratio. This rotation state is smooth without pulsation, for example, similar to the rotation state of a known electric motor.

In FIG. 3C, the shaft-attached magnetic disk 79 includes the magnetic disk 80 that rotates integrally with the engine output shaft 34, and the magnetic shaft (shaft-attached magnetic cylinder) 90 includes a magnetic cylinder 84 that rotates integrally with the drive shaft 40.

In this case, the shaft-attached magnetic disk 79 and the magnetic shaft 90 rotate around their axes in a non-contact manner due to magnetic attraction force and magnetic repulsion force between the rotating magnetic disk 80 and the cylindrical side surface 93 of the rotating permanent magnet cylinder 94.

The rotation ratio in the non-contact power transmission mechanism 60 is determined by the ratio of the number of magnetic teeth (the number of poles) provided on the outer peripheral portion of the principal surface of the magnetic disk 80 to the number of poles provided on one circumference of the outer periphery of the permanent magnet cylinder 94. By appropriately setting the number of these poles, it is possible to appropriately set the ratio of the rotation speed (number of rotations) of the permanent magnet cylinder 94 on the driven side to the rotation speed (number of rotations) of the magnetic disk 80 on the drive side.

The ratio of the rotation speed on the driven side to the rotation speed on the drive side may be set to 1:1, 1:n, or m:1 (n and m are integers).

In the non-contact power transmission mechanism 60 described with reference to FIGS. 3A to 3C, the shaft-attached magnetic disk 79 is the drive side, and the magnetic shaft (shaft-attached magnetic cylinder) 90 is the driven side.

The present invention is not limited to this, and the magnetic shaft (shaft-attached magnetic cylinder) 90 may be the drive side and the shaft-attached magnetic disk 79 may be the driven side.

Second Embodiment

Next, for the convenience of understanding the power transmission mechanism 50A (FIGS. 1 and 2A) of the motorcycle 10 according to the first embodiment, the power transmission mechanism 50B of the motorcycle 10 (FIG. 2B) according to the second embodiment (FIG. 2B) will be described first.

FIG. 4 is a schematic view of an overall power transmission mechanism of the motorcycle 10 (FIG. 2B) according to the second embodiment, from a power unit 17B including the power transmission mechanism 50B to the rear wheel 32.

As shown in FIG. 4, the motorcycle 10 according to the second embodiment transmits power from the power unit 17B including an engine 15B and the transmission 36 to the rear wheel 32 through the power transmission mechanism 50B (including only the non-contact power transmission mechanism 60), a shaft drive mechanism 52B, and the rear wheel axle 48.

Actually, since the power unit 17B includes a speed reduction mechanism, the speed reduction ratio of the non-contact power transmission mechanism 60 is set to approximately 1:1.

Due to the rotation of the engine 15B, the shaft-attached magnetic disk 79, in other words, the engine output shaft 34 and the magnetic disk 80 rotate integrally in the direction of the arrow.

The permanent magnet cylinder 94 (magnetic shaft 90) rotates in synchronization with the rotation of the magnetic disk 80.

The magnetized cylindrical side surface 93 of the magnetic shaft 90 (the cylindrical side surface of the permanent magnet cylinder 94) is disposed at a predetermined distance s from the magnetic surface (principal surface) of the magnetic disk 80.

One end of the drive shaft 40 is mechanically coupled to the magnetic shaft 90. The drive shaft 40 constituting the shaft drive mechanism 52B rotates in the arrow direction.

The other end of the drive shaft 40 rotates a rear wheel axle 48 (rear wheel 32) in the arrow direction (forward direction) via a constant velocity joint 42 (not shown in FIG. 4, see FIG. 2B) and a speed reduction mechanism 44 (including a bevel pinion 46 and a bevel gear 47) having a speed reduction ratio of several times, for example.

As described above, in the motorcycle 10 according to the second embodiment having relatively small and medium displacement, the power of the power unit 17B is transmitted to the rear wheel 32 using the power transmission mechanism 50B that includes only the non-contact power transmission mechanism 60. Thus, smooth travelling can be performed with low vibration and low noise, in the entire speed range from starting to high speed.

In this case, as compared with a motorcycle 10P according to the prior art shown in FIG. 2C in which power of the power unit 17A is transmitted to the rear wheel 32 by a mechanical coupling mechanism (speed reduction mechanism) such as a chain or a drive shaft, the motorcycle 10 according to the second embodiment allows idling between the magnetic disk 80 and the permanent magnet cylinder 94 (magnetic shaft 90) for an excessive load when passing through a step or the like. Therefore, the motorcycle 10 having the power transmission mechanism 50B (the non-contact power transmission mechanism 60) makes it easier to secure structural strength as compared with the motorcycle 10P.

Further, in the power transmission mechanism 50B, precise shim adjustment of a speed reduction mechanism 37 (bevel gear/bevel pinion speed reduction mechanism having a speed reduction ratio of approximately 1:1), a universal joint 49, and the like related to a shaft drive mechanism 52E (FIG. 2C) is not necessary, or man-hours for such an adjustment are reduced. Thus assembly work and adjustment work are facilitated. Therefore, the cost of the power transmission mechanism 50B can be reduced.

First Embodiment

Next, the power transmission mechanism 50A (FIGS. 1 and 2A) of the motorcycle 10 according to the first embodiment will be further described with reference to FIG. 5A, FIG. 5B, FIG. 6A, FIG. 6B, FIG. 7, FIG. 8A, and FIG. 8B.

Figure 5A:
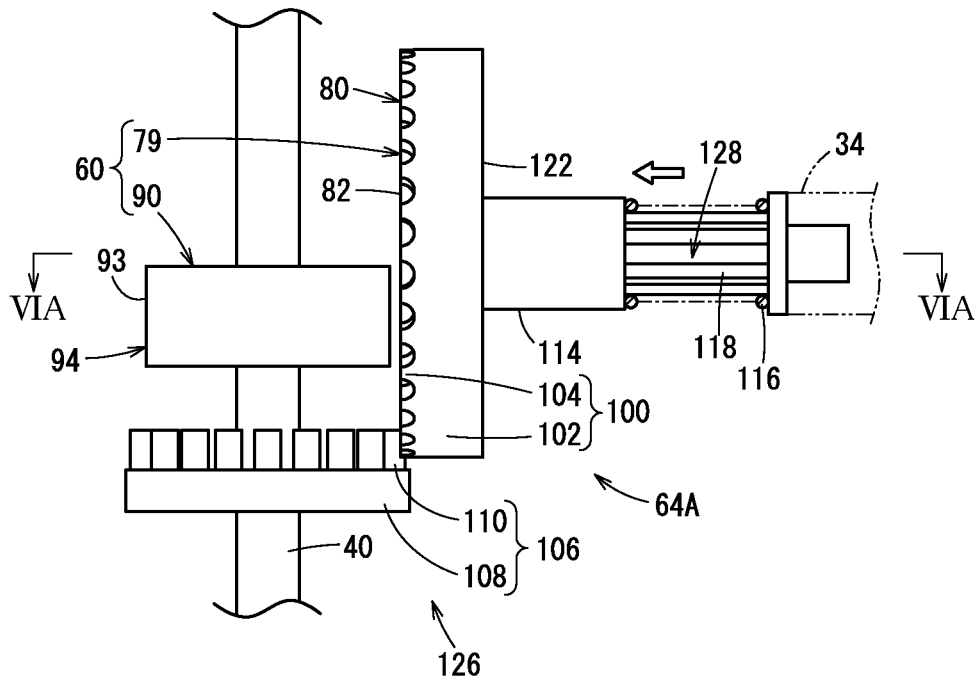
FIG. 5A is an explanatory view (plan view) of the mechanical power transmission mechanism constituting the power transmission mechanism of the motorcycle according to the first embodiment when the gears are engaged.
Figure 5B:
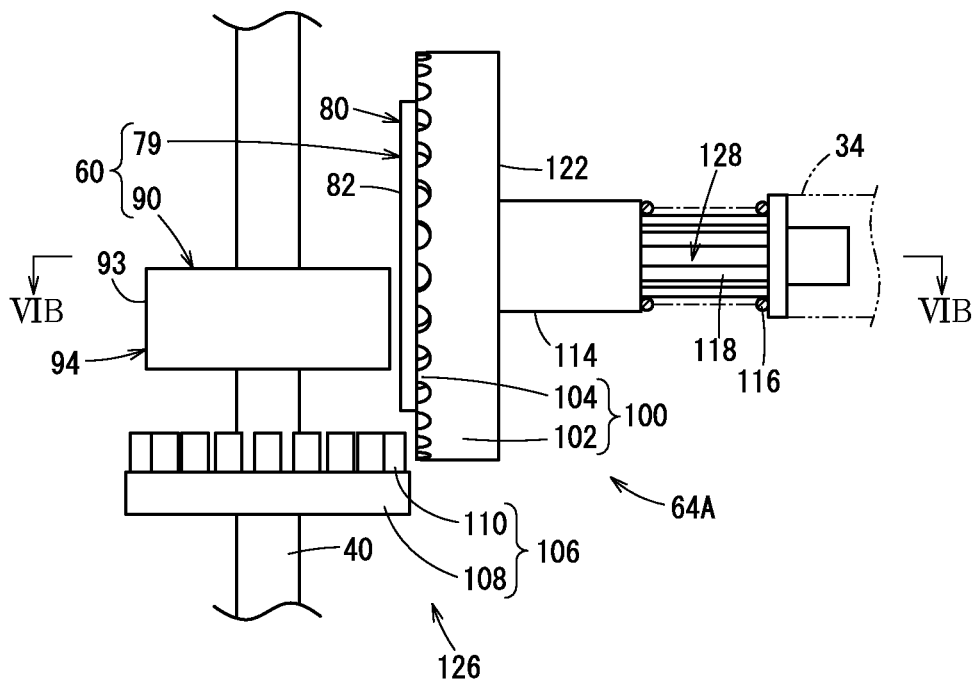
FIG. 5B is an explanatory view (plan view) of the mechanical power transmission mechanism constituting the power transmission mechanism of the motorcycle according to the first embodiment when the gears are disengaged.
Figure 6A:
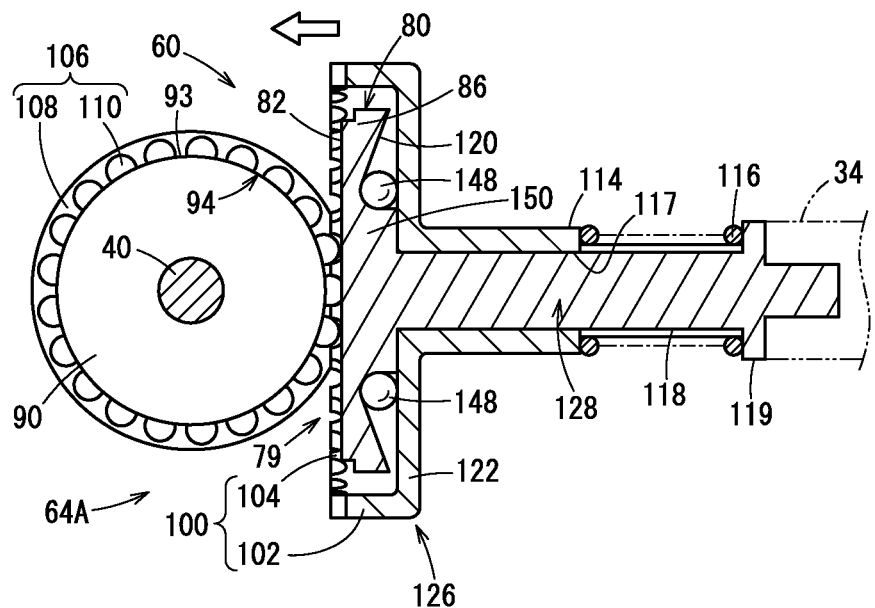
FIG. 6A is a cross-sectional view taken along line VIA-VIA of FIG. 5A.
Figure 6B:
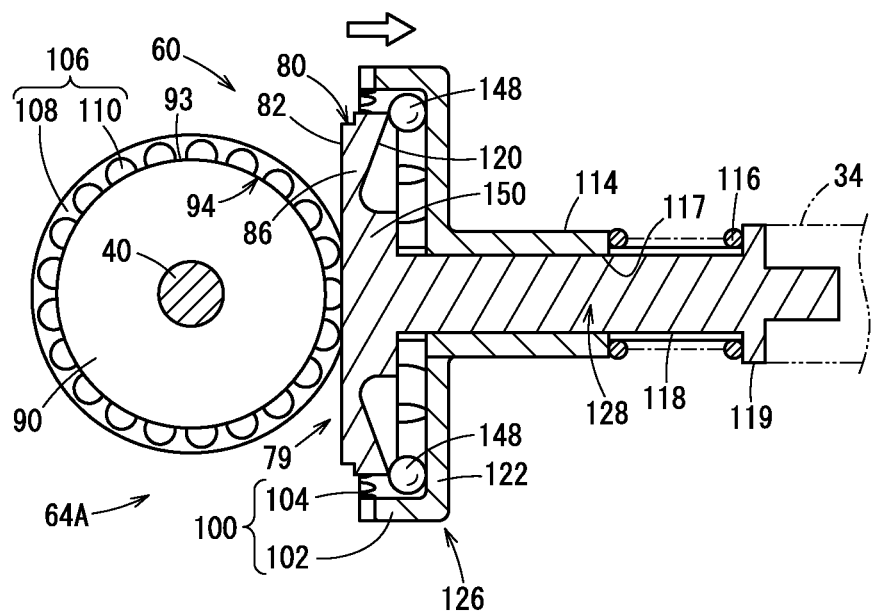
FIG. 6B is a cross-sectional view taken along line VIB-VIB of FIG. 5B.
Figure 7:
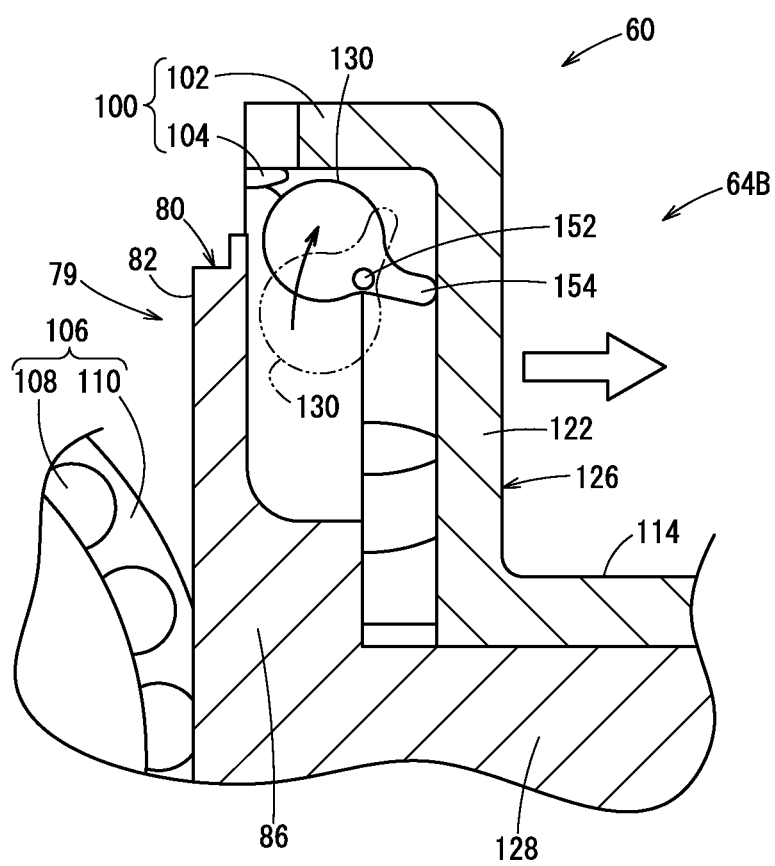
FIG. 7 is an explanatory view (schematic cross-sectional view) of another example of the mechanical power transmission mechanism constituting the power transmission mechanism of the motorcycle according to the first embodiment when the gears are engaged and disengaged.
Figure 8A:
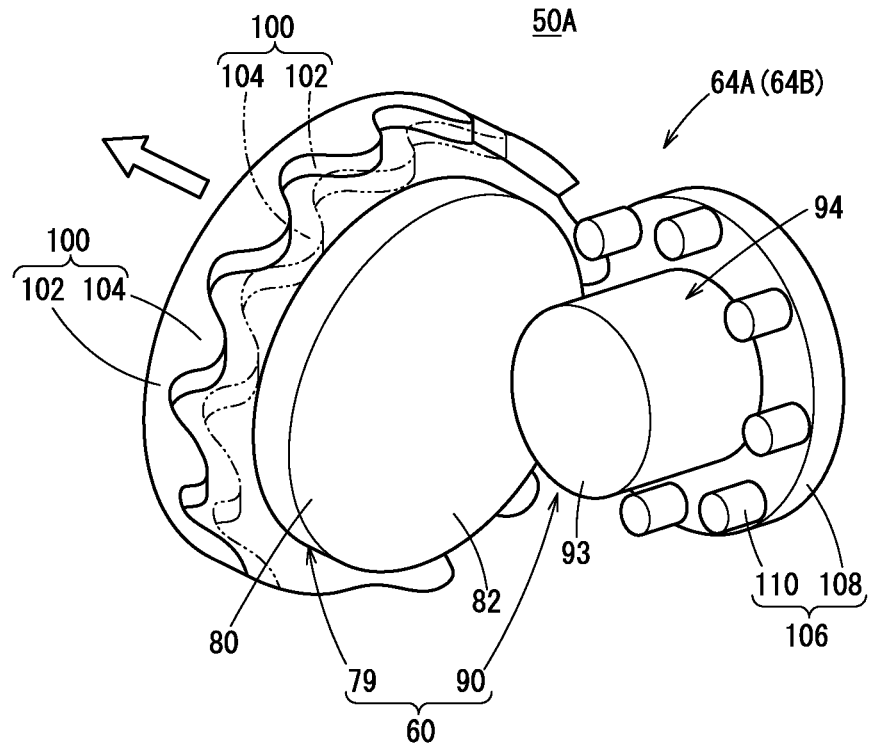
FIG. 8A is a perspective view illustrating the operation of the power transmission mechanism of the motorcycle according to the first embodiment.
Figure 8B:
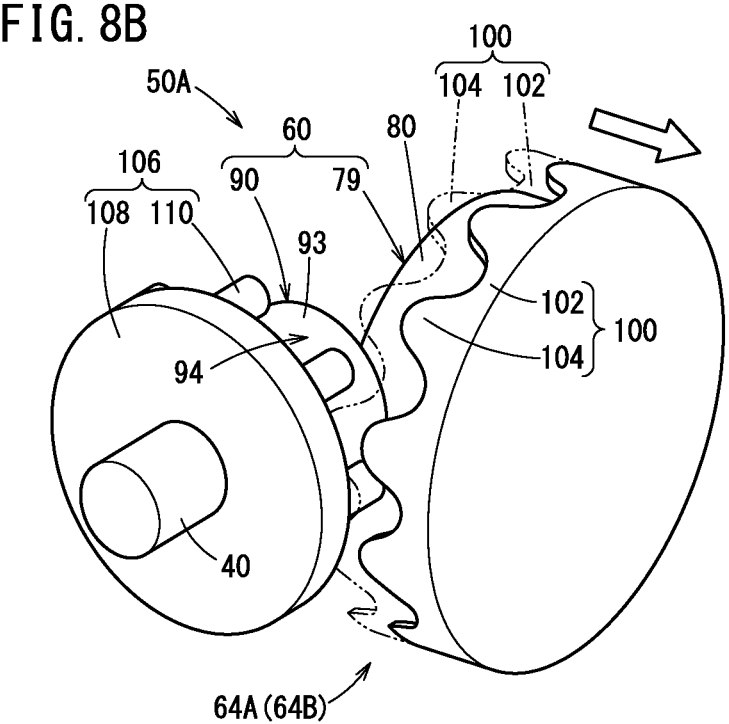
FIG. 8B is a perspective view illustrating the operation of the power transmission mechanism of the motorcycle according to the first embodiment as viewed from another direction.

FIG. 5A is an explanatory view of the mechanical power transmission mechanism 64A constituting the power transmission mechanism 50A of the motorcycle 10 according to the first embodiment when the gears are connected, and FIG. 5B is an explanatory view of the mechanical power transmission mechanism 64A constituting the power transmission mechanism 50A of the motorcycle 10 according to the first embodiment when the gears are separated. FIG. 6A is a cross-sectional view taken along line VIA-VIA of FIG. 5A, and FIG. 6B is a cross-sectional view taken along line VIB-VIB of FIG. 5B. FIG. 7 is an explanatory view of another example of a mechanical power transmission mechanism 64B constituting the power transmission mechanism 50A of the motorcycle 10 according to the first embodiment when the gears are engaged and disengaged. FIG. 8A is a perspective view illustrating the operation of the power transmission mechanism 50A constituting the motorcycle 10 according to the first embodiment, and FIG. 8B is a perspective view illustrating the operation of the power transmission mechanism 50A constituting the motorcycle 10 according to the first embodiment as viewed from another direction.

A so-called clutch mechanism is applied to the mechanical power transmission mechanisms (also referred to as power interrupting mechanisms) 64A and 64B. Each of the mechanical power transmission mechanisms 64A and 64B includes a crown gear 100 on the drive side and a pinion 106 on the driven side. The crown gear 100 is also referred to as a shaft-attached crown gear or a first gear, and the pinion 106 is also referred to as a shaft-attached pinion or a second gear.

In the mechanical power transmission mechanisms 64A and 64B, the crown gear 100 and the pinion 106 are meshed (connected) with each other during starting and low-speed traveling, and power is transmitted from the crown gear 100 to the pinion 106. On the other hand, during medium-speed or high-speed traveling, the connection between the crown gear 100 and the pinion 106 is disconnected by centrifugal force, and transmission of power from the crown gear 100 to the pinion 106 is blocked. The crown gear 100 and the pinion 106 in pairs form an engagement and separation member.

As shown in FIGS. 5A and 5B, the pinion 106 is constituted by a ring-shaped disk 108 and cylindrical teeth 110 formed along the circumference of the principal surface of the disk 108 and extending in the axial direction. The drive shaft 40 is fitted into the axial hole of the disk 108. Therefore, the pinion 106 rotates integrally with the drive shaft 40.

On the other hand, the crown gear 100 has a large-diameter cylindrical portion 102, and is provided with wavy teeth 104 extending in the axial direction along the outer periphery of the cylindrical portion 102 on its side facing the pinion 106.

As shown in FIGS. 6A and 6B, the outer periphery of the large-diameter cylindrical portion 102 on the engine output shaft 34 side is continuous with the outer peripheral portion of a ring-shaped disk portion 122, and the inner peripheral portion of the disk portion 122 is continuous with one end side of a cylindrical shaft portion 114.

A flange portion 126 including the teeth 104, the cylindrical portion 102, the disk portion 122, and the cylindrical shaft portion 114 is formed by integral molding.

As shown in FIG. 5B, FIG. 6B, and FIG. 8B, the wavy teeth 104 are arranged so as to surround the outer periphery of the magnetic disk 80 spacing in the radial directions.

Returning to FIG. 5A, FIG. 5B, FIG. 6A, and FIG. 6B, a spline 117 is formed in the axial hole side surface of the cylindrical shaft portion 114 in the axial direction, and the spline 117 engages with a spline shaft 118 whose one end is connected to the axial center portion of the magnetic disk 80, so that the flange portion 126 can slide in the axial direction of the engine output shaft 34.

A rivet-shaped portion 128 including the spline shaft 118 and the yoke disk 86 of the magnetic disk 80 may be formed by integral molding.

In the spline shaft 118 formed in the rivet-shaped portion 128, a flange portion 119 is formed on the engine output shaft 34 side, the flange portion 119 is fixed to the engine output shaft 34, and the engine output shaft 34 and the magnetic disk 80 are integrally rotatable.

The flange portion 126 is biased by compression force of a spring 116 provided between an end portion of the cylindrical shaft portion 114 and the flange portion 119 so as to be slidable outward in the axial direction (a direction indicated by thick (open) arrows in FIGS. 5A and 6A).

When the engine output shaft 34 stops rotating or rotates at low speed as shown in FIGS. 5A and 6A, the flange portion 126 is biased in the direction of the thick arrow by the compression force of the spring 116, and the teeth 104 of the crown gear 100 and the teeth 110 of the pinion 106 mesh with each other. Thus, the mechanical power transmission mechanism (also referred to as a power interrupting mechanism) 64A is brought into a connected state.

In this case, the rotation of the engine output shaft 34 is transmitted as the rotation of the drive shaft 40 through the crown gear 100 and the pinion 106 (engagement and separation member). Since the teeth 104 of the crown gear 100 have a wavy shape, when the rivet-shaped portion 128 moves in the arrow direction shown in FIGS. 5A and 6A, the teeth 104 easily engage (mesh with) the cylindrical teeth 110 of the pinion 106. Thus, the mechanical power transmission mechanism 64A is brought into a connected state.

As shown in FIGS. 6A and 6B, in the internal space of the large-diameter cylindrical portion 102, the joint portion between the spline shaft 118 and the back surface of the magnetic disk 80 (yoke disk 86) is a columnar portion 150 having a diameter larger than that of the spline shaft 118.

On the back surface of the magnetic disk 80 (yoke disk 86), at least three grooves 120 are provided. The grooves 120 extend radially outward from the side peripheral portion of the columnar portion 150 and gradually become shallower.

The central angles between at least three grooves 120 are set to be equal angles (120 degree intervals in the case of three grooves, 90 degree intervals in the case of four grooves, 72 degrees in the case of five grooves, 60 degree intervals in the case of six grooves . . . ). Balls 148 are inserted into the respective grooves 120. The diameters of the balls 148 are set such that the bottom surface of the columnar portion 150 can contact the principal surface of the disk portion 122 when the engine output shaft 34 is stopped as shown in the FIG. 6A.

Centrifugal force acts on the balls 148 by the rotation of the engine output shaft 34. When the centrifugal force on the balls 148 exceeds the compression force of the spring 116 at a predetermined rotation speed (a transition speed between low speed and medium speed), the balls 148 move radially outward in the grooves 120.

The principal surface of the disk portion 122 of the flange portion 126 is pushed in the direction of arrow as shown in FIG. 6B through the balls 148 moved outward in the radial directions. When the principal surface of the disk portion 122 is pushed, the teeth 104 of the crown gear 100 and the teeth 110 of the pinion 106 are disengaged from each other. That is, the mechanical power transmission mechanism 64A is disconnected.

At a rotational speed exceeding the predetermined rotation speed, in other words, at a vehicle speed equal to or higher than the medium to high speed, the rotation of the engine output shaft 34 is transmitted to the drive shaft 40 only by the non-contact power transmission mechanism 60.

Before the crown gear 100 and the pinion 106 are disengaged from each other, the rotational power of the engine output shaft 34 is transmitted to the drive shaft 40 through both the non-contact power transmission mechanism 60 and the mechanical power transmission mechanism 64A.

FIG. 7 is a schematic cross-sectional view of the mechanical power transmission mechanism 64B of another example. In the mechanical power transmission mechanism 64B, weights (pendulums) 130 are provided on support shafts 152, at at least three positions on an outer peripheral portion of the yoke disk 86.

When the centrifugal force acts, each of the weights 130 rotates in the arrow direction, and the inner surface of the disk portion 122 of the flange portion 126 is pushed in the direction of thick (open) arrow (the axial direction of the engine output shaft 34) by a protruding portion 154 of the weight 130. Thus, the teeth 104 of the crown gear 100 and the teeth 110 of the pinion 106 are disengaged from each other.

[Operation of Power Transmission Mechanism 50A]

As shown in FIGS. 8A and 8B, in the non-contact power transmission mechanism 60, the magnetic shaft 90 (the cylindrical side surface 93) and the shaft-attached magnetic disk 79 (the magnetic disk 80) are engaged with each other in a non-contact state in the entire rotational speed range of the engine output shaft 34. On the other hand, at the time of stop or low-speed rotation, the crown gear 100 constituting the mechanical power transmission mechanisms 64A and 64B moves to a position indicated by an imaginary line and meshes with the pinion 106. At the time of medium to high-speed rotation of the engine output shaft 34, the crown gear 100 moves to a position indicated by a solid line and disengages from the pinion 106.

[First Modification]

FIG. 9A is a schematic view illustrating a shaft drive mechanism 52C of the motorcycle 10 according to a first modification.

In the motorcycle 10, the power transmission mechanism 50C is provided between the rear wheel 32 and the drive shaft 40. The power transmission mechanism 50C replaces the speed reduction mechanism 44.

A magnetic shaft 90 provided with a permanent magnet cylinder 94 is disposed on the constant velocity joint 42 side of the power transmission mechanism 50C, and a magnetic disk 80 is disposed on the rear wheel 32 side. The magnetic disk 80 rotates integrally with the rear wheel axle 48 (see FIG. 1) of the rear wheel 32.

The power transmission mechanism 50C includes a non-contact power transmission mechanism and a mechanical power transmission mechanism in parallel. The motorcycle 10 is a vehicle having a relatively large displacement.

[Second Modification]

FIG. 9B is a schematic view illustrating a shaft drive mechanism 52D of the motorcycle 10 according to the second modification.

In the motorcycle 10, a power transmission mechanism 50D is provided between the rear wheel 32 and the drive shaft 40. The power transmission mechanism 50D replaces the speed reduction mechanism 44.

A magnetic shaft 90 including a permanent magnet cylinder 94 having a magnetized cylindrical side surface 93 is disposed on the constant velocity joint 42 side of the power transmission mechanism 50D, and a magnetic disk 80 is disposed on the rear wheel 32 side. The magnetic disk 80 rotates integrally with the rear wheel axle 48 (see FIG. 1) of the rear wheel 32.

The power transmission mechanism 50D includes only a non-contact power transmission mechanism, and the motorcycle 10 has a relatively small displacement.

The present invention is not limited to the above-described embodiments, and various configurations can be adopted based on the description of the specification. For example, the engine output shaft may be a magnetic shaft, and the drive shaft may be provided with a magnetic disk. Alternatively, the drive shaft may be provided with a magnetic shaft, and the rear wheel may be provided with a magnetic disk. Further, the present invention does not have to be applied to a motorcycle, but may be applied to a three-wheeled or four-wheeled vehicle.

What is claimed is:

1. A motorcycle comprising a power transmission mechanism configured to transmit power of a power unit to a rear wheel,
   wherein the power transmission mechanism includes a non-contact power transmission mechanism and a mechanical power transmission mechanism which are provided on a power unit side or a rear wheel side,
   the non-contact power transmission mechanism includes a magnetic disk whose principal surface is magnetized and a magnetic shaft facing the principal surface of the magnetic disk, the magnetic disk configured to rotate around its axis,
   the mechanical power transmission mechanism includes an engagement and separation member, the engagement and separation member being engaged when the magnetic disk or the magnetic shaft is rotated at a low speed, the engagement and separation member being separated when the magnetic disk or the magnetic shaft is rotated at a medium to high speed.

2. The motorcycle according to claim 1, wherein the power transmission mechanism is provided on the power unit side, and
   the power of the power unit is transmitted to the rear wheel through the power transmission mechanism and a speed reduction mechanism.

3. The motorcycle according to claim 1, wherein the engagement and separation member of the mechanical power transmission mechanism includes a first gear provided on a magnetic disk side of the magnetic disk and a second gear provided on a magnetic shaft side of the magnetic shaft, and teeth of the first gear are arranged so as to surround the magnetic disk.

4. The motorcycle according to claim 3, wherein the first gear is a crown gear and the second gear is a pinion meshing with the crown gear.

* * * * *